Patented June 6, 1950

2,510,367

UNITED STATES PATENT OFFICE 2,510,367

RODENT AND DEER REPELLENTS

Luther L. Baumgartner, Yonkers, N. Y., assignor to The B. F. Goodrich Company, New York, N. Y., a corporation of New York No Drawing. Application December 3, 1947, Serial No. 789,559

4 Claims. (Cl. 167—30)

This invention relates to the protection of edible materials and the like from destruction and consumption by depredating animals and more specifically relates to rodent and deer repellent compositions containing, as the active ingredient, the product of the reaction of three molecular equivalents of n-butyraldehyde with one molecular equivalent of aniline.

The control of rodents in the United States has become a serious problem. It has been estimated by the U. S. Department of Interior, Division of Predator and Rodent Control, that rats alone annually cause two dollars' damage for each person of the country even after more than forty years of effort in attempting to reduce rat population and prevent damage. In addition, many other rodents cause considerable damage to crops and stored materials. For example, pine mice (Pitymys sp.) and orchard mice (Microtus sp.) have frequently put entire peach and apple orchards out of production by girdling the trees and eventually killing them. In fact, a small colony of only five to ten mice can in one winter kill a fruit tree valued at several hundred dollars. Rabbits also cause great damage to garden and truck crops by consuming the young plants and to fruit trees and nursery stock by girdling the trees and shrubs. Woodchucks also have similar depredating habits. It has also been reported that, in one season, porcupines caused a 10—25% loss of the sweet corn crop grown for the canning industry in Maine.

To reduce these damages many methods of rodent control have been suggested. These methods fall within two general classes. The first general class approaches the problem of control by attempting to kill the pests either by the use of traps or by the use of poisons. The second general class approaches the control problem by the use of either mechanical repellent means as for example by the use of such mechanical devices as fences, guards, and the like through which the rodent pests cannot go, or by the use of a chemical repellent material which is obnoxious to such senses of the rodents as smell and taste.

Killing rodent pests by trapping or poisoning is not entirely successful because the rodents have an uncanny ability to learn to avoid traps and poisoned baits. Thus, in the case of rat control, the rats will in a short time avoid the poisoned baits and continue to attack the crops, stored goods, or whatever is to be protected. As a rule, it is undesirable to treat the material to be protected with the poisonous material, especially if it is foodstuff that is being protected, for the rodent poisons either are injurious to the consumer of the food products, or the poisons will otherwise make the foodstuffs less attractive to the consumer. Another disadvantage which is brought about by the use of rodent poisons is that the rodent must consume a sufficient amount of the material to be protected to ingest a lethal dose of the poison. In doing this, the rodent has caused serious damage to a unit of the material because of the removal of a portion of the packaging means allowing some of the material to find its way out and be contaminated, or to allow the entrance of other rodents to the packaged goods without exposing them to the poison, or to allow the entrance of insect and fungus pests which are equally destructive. If the poison does not act instantaneously, and few if any do, the rodent can continue his destructive gnawing before the poison takes its toll. Consequently, it is highly desirable to employ a material which repels the animals before they can do any damage.

Deer also cause considerable damage to farm and truck crops each year. Although the deer population in many areas is negligible, those areas which have deer experience serious losses to farm and truck crops. The problem of combatting the destruction caused by deer is extremely difficult, for such methods of control as poisoning, trapping and shooting cannot be employed since deer are protected by strict game laws. There remains then, either fencing the deer out of the agricultural plots to be protected, or repelling the deer by spraying some material that is in some manner obnoxious to deer on or near the plants to be protected to prevent the deer from feeding on the plants. Fencing deer out is not only extremely difficult but is also quite expensive. Since deer are quite adept at jumping, fences, ten feet or more in height, must be built and maintained to accomplish the desired objective. Thus, the only economical and legal method of combatting deer is through the application of some repellent material to the area to be protected.

I have discovered that the product of the reaction of three molecular equivalents of butyraldehyde with one molecular equivalent of aniline is an exceedingly effective repellent for rats, mice, deer and other depredating animals. This reaction product when incorporated with the favorite foods of deer, in concentrations as low as 6% or lower, will prevent the deer from feeding. Similarly, its presence in favorite foods of rats and mice, in concentrations as low as 10% or lower, will prevent the feeding of these animals.

The reaction product can be prepared by adding 1 mole of aniline to 3 moles of butyraldehyde (a commercial grade containing a minor portion of 2-ethylhexenal being as satisfactory as pure butyraldehyde), and refluxing the mixture in the presence of a small amount of acetic acid. After removing water, the reaction product is an oily material having a brown to red color and a refractive index of 1.575 (D scale at 20° C.). The method of making the reaction product and the product per se are well known to the art.

The following examples of laboratory and field tests demonstrate the efficiency of the oily product of the above-described reaction as a rodent and deer repellent.

In the laboratory, the Sherman strain of white rat proved to be the most difficult to repel. In the following examples the laboratory tests were made with this variety.

LABORATORY TESTS

Example 1

A quantity of standard rodent food concentrate pellets each 3.5 grams in weight, one-half inch in diameter and five-eighths of an inch long were ground and a sufficient amount of the oily reaction product was added to give the desired concentration of 10% by weight. A small amount of ethyl alcohol was added to the mixture to form a dough-like paste which was then extruded and cut to form pellets of the same size and shape as the pellets fed as the daily diet of the rats. The pellets formed from the treated food were of a color only slightly different from that of the untreated pellets; the difference was only detectable when the two were considered together. Four pellets of the treated food were placed in a cage containing a single rat for a 24 hour feed. Ten individual rats were so fed each day with new food pellets each day. After the food was thus exposed to the rats for 24 hours, the pellets were removed and the amount of feeding was determined. The test was conducted on three consecutive days. During the three day feeding program there was no feeding by any of the rats on the pellets.

Example 2

Standard food concentrate pellets were coated with the oily reaction product so that 10% by weight of the oily material was deposited on the surface of the pellet. The tests with these treated pellets were conducted as described in Example 1. The total feeding during the feeding program was only 1% of the weight of the pellets fed.

In the field the repellents were used against rats and mice in orchards, barns, grain storage bins, warehouses where packaged foodstuffs were stored, market places, etc. with the results shown in the following examples.

FIELD TESTS

Example 3

Packages containing individual servings of prepared ready-to-eat cereals were coated with a composition containing paraffin wax and 10% by weight of the oily reaction product. These packages were distributed together with untreated packages in places known to be inhabited by rats and mice. The packages were left undisturbed from November to January. In January the boxes were collected and observed to determine the effectiveness of the treatment. None of the treated boxes were opened although rodent teeth marks were found on each of them. Without exception all untreated boxes had been broken open and the contents either entirely consumed or contaminated.

Example 4

An alcohol solution containing 25% by weight of the reaction product hereinbefore described was painted on small apple twigs 36 inches long and about ¼ inch in diameter. These, together with untreated twigs of the same size, were placed over rodent (Microtus sp.) runways, in an apple orchard and covered with straw. After two months' exposure to these conditions, the untreated twigs were from 50 to 90% consumed while the treated twigs were less than 5% eaten.

Example 5

In February on a game reserve, 45 ounces of cedar browse on which 3 ounces of the oily reaction product before described was deposited and an untreated bunch of browse weighing 56 ounces were hung together at a deer feeding station. Seven days later the untreated browse had lost 36 ounces, while the treated browse had lost no weight. Another bunch of untreated browse was hung up with the treated browse. Twelve days later the weight of the untreated browse had been reduced from 48 ounces to 20 ounces, a loss of 28 ounces due to deer feeding, while the treated browse had lost only 2 ounces. The bunch of treated browse now weighing 46 ounces was moved to a new feeding station and hung near a bunch of untreated browse weighing 48 ounces. The following day the untreated browse had lost 14 ounces while the treated browse had lost no weight.

This oily product of the reaction of three molecular equivalents of butyraldehyde with one molecular equivalent of aniline can be also successfully employed to protect young trees, shrubs and the like as well as the non-edible portions of plants which produce food for human consumption by applying a solution or aqueous dispersion of the oily reaction product or the oily material itself to these plants or portions of plants. Where it is not desirable to apply this oily material to the edible portion of food producing plants, the repellent either can be applied to the plant before the edible portion of the plant forms or can be applied to the ground adjacent to the plants or can be applied around the plot as a protective border.

Various means for applying this oily reaction product have been used. The repellent material can be deposited on an article to be protected by applying a solution of the repellent to the article and removing the solvent. Another method of employing the repellent is to disperse the repellent in water with a wetting or dispersing agent and applying the aqueous dispersion to the article to be protected. Where the repellent is subjected to weathering usually it will be desirous to employ an adhesive or sticking agent to prevent the repellent from being removed by rain or other forms of moisture. One of the preferred methods of applying the repellent is to incorporate the oily material in the desired amount in an aqueous dispersion of a polymeric organic polysulfide which is capable of forming a microscopic, translucent, discontinuous, rubbery film on drying. The oily repellent and the polymeric organic polysulfide dispersion can be very easily combined especially if the aqueous dispersion of the polymeric polysulfide is prepared according to the methods described in U. S. Patent No. 2,106,564 and in a copending application of W. D. Stewart, Serial No. 599,316, filed June 13, 1945, now Patent No. 2,448,636. An aqueous dispersion of polyethylene pentasulfide containing 2 pounds of the polymeric polysulfide (prepared by reacting ethylene dichloride with sodium pentasulfide in the presence of a salt-stable emulsifying agent) and containing 10% by weight of this oily repellent can be sprayed on soy bean plants, young corn plants and others to repel deer, rabbits and other animal pests having similar depredating habits.

Still another method of employing this oily repellent is to incorporate it in such coating materials as paraffin wax and then apply the wax composition usually to packaging means. This repellent can also be incorporated in plastic coating and film forming materials in paper pulp or can be deposited on fibers from which bags are made and the repellent containing composition then made up into packaging means. This repellent also can be mixed with suitable dry porous diluents such as clays, talc and the like and be employed as dusts to protect plants and stored goods. Thus, it is apparent that this oily product of the reaction of butyraldehyde and aniline can be easily and economically employed as a rodent and deer repellent.

While I have disclosed specific examples of my invention, I do not thereby desire or intend to limit myself solely thereto, for as hitherto stated the precise proportions of the materials utilized may be varied and the means employed in utilizing the repellent can be varied without departing from the spirit and scope of the invention as defined in the appended claims.

1. A package capable of protecting goods from destruction and consumption by rodents which comprises a packaging material on which is deposited a composition containing 90% by weight paraffin wax and 10% by weight of the oily product of the reaction of three equivalents of butyraldehyde with one equivalent of aniline said oily product having a brown to red color and an index of refractivity of about 1.575.

2. A package capable of protecting goods from destruction and consumption by rodents made of a packaging material on the outside surfaces of which is uniformly deposited a composition containing a rodent repelling agent which is the oily product of the reaction of three molecular equivalents of butyraldehyde with one molecular equivalent of aniline, said oily product having a brown to red color and an index of refractivity of about 1.575, said agent being present in an amount such as to repel rodents from attacking the package without otherwise substantially affecting the properties thereof.

3. A rodent and deer repellent composition in liquid form suitable for application by coating, painting, spraying and the like, said composition containing, as the active repelling agent, from 6 to 25% by weight of the oily product of the reaction of three molecular equivalents of butyraldehyde with one molecular equivalent of aniline, said oily product having a brown to red color and an index of refractivity of about 1.575.

4. A rodent and deer repellent composition comprising an active repelling agent dispersed in an aqueous solution of a dispersing agent, said active repelling agent being present in an amount from 6 to 25% by weight and consisting of the oily product of the reaction of three molecular equivalents of butyraldehyde with one molecular equivalent of aniline, said oily product having a brown to red color and an index of refractivity of about 1.575.

LUTHER L. BAUMGARTNER.

REFERENCES CITED

The following references are of record in the file of this patent:

UNITED STATES PATENTS

| Number | Name | Date |
|---|---|---|
| 1,780,326 | Williams et al. | Nov. 4, 1930 |
| 1,871,949 | Bottrell | Aug. 16, 1932 |
| 2,043,941 | Williams | June 9, 1936 |
| 2,187,847 | Andersag | Jan. 23, 1940 |
| 2,427,647 | Vahlteich | Sept. 16, 1947 |

OTHER REFERENCES

Mills: Wildlife Research and Management Leaflet, BS–117, U. S. D. A. Bureau of Biological Survey, June 1938, pages 1–5.